United States Patent
Baldwin et al.

(10) Patent No.: US 9,342,560 B2
(45) Date of Patent: May 17, 2016

(54) NODE VALIDATION IN A NETWORK

(71) Applicant: International Business Machines, Armonk, NY (US)

(72) Inventors: Timothy J. Baldwin, Winchester (GB); Peter J. Johnson, Winchester (GB); David Locke, Winchester (GB); Fenglian Xu, Winchester (GB)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 13/972,687

(22) Filed: Aug. 21, 2013

(65) Prior Publication Data

US 2014/0059044 A1 Feb. 27, 2014

(30) Foreign Application Priority Data

Aug. 22, 2012 (GB) .................................. 1214950.6

(51) Int. Cl.
*G06F 17/30* (2006.01)

(52) U.S. Cl.
CPC ...... *G06F 17/3053* (2013.01); *G06F 17/30958* (2013.01)

(58) Field of Classification Search
CPC ....................... G06F 17/3053; G06F 17/30958
USPC ......................................................... 707/723
See application file for complete search history.

(56) References Cited

U.S. PATENT DOCUMENTS

| | | | |
|---|---|---|---|
| 7,203,753 B2 * | 4/2007 | Yeager et al. ................. | 709/225 |
| 7,249,380 B2 | 7/2007 | Yang | |
| 7,856,658 B2 | 12/2010 | James | |
| 8,126,816 B2 | 2/2012 | Mu et al. | |
| 8,843,997 B1 * | 9/2014 | Hare ................... | H04L 63/0281 709/200 |
| 8,931,041 B1 * | 1/2015 | Banerjee ............... | H04L 63/102 726/1 |
| 2003/0220802 A1 | 11/2003 | Cossey et al. | |
| 2009/0112989 A1 * | 4/2009 | Anderson et al. ............. | 709/204 |
| 2009/0222399 A1 * | 9/2009 | Gomez et al. .................. | 706/52 |

(Continued)

FOREIGN PATENT DOCUMENTS

| | | |
|---|---|---|
| CN | 101217396 A | 7/2008 |
| CN | 101714976 A | 5/2010 |
| EP | 2037386 A1 | 3/2009 |

OTHER PUBLICATIONS

Glynos, Dimitris, et al., "Preventing Impersonation Attacks in MANET with Multi-factor Authentication", WIOPT 2005, Riva del Garda, Trentino, Italy, Apr. 3-7, 2005, pp. 59-64.*

(Continued)

*Primary Examiner* — Robert Stevens
(74) *Attorney, Agent, or Firm* — Yee & Associates, P.C.; Parashos Kalaitzis

(57) ABSTRACT

A method of operating a network of connected nodes comprises the steps of maintaining a trust value for each node in the network, maintaining one or more attributes for each node in the network, each attribute comprising a value and a respective confidence level, and performing a validation of a specific attribute of a specific node. The validation comprises the steps of querying nodes connected to the specific node for specific attribute values for the specific node, creating a results set from the returned attribute values from the connected nodes and the trust values of the connected nodes, and processing the results set according to a predefined algorithm to determine a new value and/or a new confidence level for the specific attribute of the specific node.

18 Claims, 6 Drawing Sheets

(56) References Cited

U.S. PATENT DOCUMENTS

| | | | |
|---|---|---|---|
| 2009/0282473 A1* | 11/2009 | Karlson et al. | 726/17 |
| 2009/0328148 A1* | 12/2009 | Lee et al. | 726/3 |
| 2010/0146118 A1* | 6/2010 | Wie | 709/225 |
| 2010/0169265 A1 | 7/2010 | Ristock et al. | |
| 2011/0209194 A1* | 8/2011 | Kennedy | G06F 21/55 726/1 |
| 2012/0015699 A1 | 1/2012 | Kalvachev | |
| 2012/0233463 A1* | 9/2012 | Holt | G06F 17/30575 713/168 |
| 2013/0091582 A1* | 4/2013 | Chen | G06Q 10/10 726/26 |
| 2013/0247224 A1* | 9/2013 | Karlson et al. | 726/28 |
| 2013/0282920 A1* | 10/2013 | Zhang | H04L 45/74 709/238 |
| 2014/0181995 A1* | 6/2014 | Smith | G06F 21/6254 726/28 |
| 2014/0280798 A1* | 9/2014 | Bahl et al. | H04L 41/00 709/220 |

OTHER PUBLICATIONS

Golbeck, Jennifer, et al., "Chapter 7: The Ripple Effect: Change in Trust and Its Impact Over a Social Network", AUTO '93, Antonio, TX, Sep. 20-23, 1993, pp. 367-375.*

Jameel, Hassan, et al., "A Trust Model for Ubiquitous Systems based on Vectors of Trust Values", ISM 2005, Irvine, CA, Dec. 12-14, 2005, 6 pages.*

Karthik, N., et al., "Trust Calculation in Wireless Sensor Networks", ICECTECH 2011, Kanyakumari, India, Apr. 8-11, 2011, pp. 376-380.*

Liu, Guanfeng, et al., "Optimal Social Trust Path Selection in Complex Social Networks", 24th AAAI Conf. on Artificial Intelligence (AAAI-10), Ass'n for the Advancement of Artificial Intelligence, © 2010, pp. 1391-1398.*

Mishra, Abhinav, et al., "Finding the Bias and Prestige of Nodes in Networks based on Trust Scores", WWW 2011, Hyderabad, India, Mar. 28-Apr. 1, 2011, pp. 567-576.*

Mohan, Apurva, et al., "AttributeTrust—a Framework for Evaluating Trust in Aggregated Attributes via a Reputation System", PST 2008, Fredericton, NB, Canada, Oct. 1-3, 2008, pp. 201-212.*

Trakadas, P., et al., "A novel flexible trust management system for heterogeneous wireless sensor networks", ISADS 2009, Athens, Greece, Mar. 23-25, 2009, pp. 1-6.*

Xia, H., et al., "Trust management model for mobile ad hoc network based on analytic hierarchy process and fuzzy theory", IET Wireless Sensor Systems, vol. 1, Issue 4, © 2011, pp. 248-266.*

Gupta, Manish, et al., "Heterogeneous Network-Based Trust Analysis: A Survey", ACM SIGKDD Explorations Newsletter, vol. 13, Issue 1, Jun. 2011, pp. 54-71.*

Zhang, Jie, "A Survey on Trust Management for VANETs", AINA 2011, Biopolis, Singapore, Mar. 22-25, 2011, pp. 105-112.*

Zouridaki, Charikleia, et al., "E-Hermes: A robust cooperative trust establishment scheme for mobile Ad Hoc networks", Ad Hoc Networks, vol. 7, © 2009, Elsevier B.V., pp. 1156-1168.*

Firdhous, Mohamed, et al., "A Trust Computing Mechanism for Cloud Computing", Proc. of the 2011 ITU Kaleidoscope Academic Conference, Cape Town, South Africa, Dec. 12-14, 2011, Poster Session p. 1, pp. 1-7.*

Huang, Dijiang, et al., "Secure data Processing Framework for Mobile Cloud Computing", INFCOMW 2011, Shanghai, China, Apr. 10-15, 2011, pp. 614-618.*

Shih, Wen-Chung, et al., "Due Time Setting for Peer-to-Peer Retrieval of Teaching Material in Cloud Computing Environments", ICISA 2011, Jeju Island, Korea, Apr. 26-29, 2011, pp. 1-9.*

Wu, Min, "Cloud Trust Model in E-Commerce", ISNNS '10 , Jinggangshan, P. R. China, Apr. 2-4, 2010, pp. 271-274.*

Nurmi, P., "Perseus—A Personalized Reputation System," Proceedings of the 2007 IEEE International Conference on Web Intelligence, Nov. 2007, 7 pages.

Vascallaro, J., "New ways to prove your identity online," The Wall Street Journal, post-gazette.com, Aug. 3, 2006, 7 pages, accessed Aug. 20, 2013, http://www.post-gazette.com/pg/06215/710847-96. stm.

Kruk et al., "D-FOAF: Distributed Identity Management with Access Rights Delegation," Proceedings of The Semantic Web—ASWC 2006, First Asian Semantic Web Conference, Sep. 2006, 15 pages, accessed Aug. 20, 2013, http://vmserver14.nuigalway.ie/xmlui/bitstream/handle/10379/666/jsPnVuRF_1.pdf?sequence=1.

International Search Report and Written Opinion, dated Jan. 23, 2014, regarding Application No. PCT/IB2013/056659, 8 pages.

* cited by examiner

NODE VALIDATION IN A NETWORK

CROSS-REFERENCE TO RELATED APPLICATION(S)

This Application claims the benefit of priority to United Kingdom Patent Application Serial No. GB1214950.6, filed on Aug. 22, 2012, the contents of which are hereby incorporated by reference.

DESCRIPTION

1. Field of the Invention

The present invention relates to a method of operating a network of connected nodes. The present invention provides an adaptive scoring system to validate individual information in a multiply-connected network.

2. Background

In a large network of connected individuals, it is often necessary to obtain and to validate the accuracy of many different pieces of information about each individual. Much of this information can never be known to be absolutely correct and therefore the value of each item attached to an individual will also have a level of certainty associated with it. System actions will typically depend on both the item value and its level of certainty. In addition, in such a large network, the individual nodes and their connections may vary fairly extensively over time and the information attached to each individual may be subject to change. It is important that the system can quickly and dynamically account for and adapt to such changes.

Some examples include, but are not limited to, a social network and a computing cloud. In a social network where the nodes represent people, system actions will typically depend on properties of the individuals. Certain actions, for example, might depend on a person's age; initially individuals might provide their own age but this may need to be verified before allowing some actions. Some actions may require a very high level of certainty of the age, others may accept a lower level of certainty. In a computing cloud supplying services sourced by providers in the cloud if there are many providers of a service, information may need to be maintained about the price and quality of service from each provider to help route client requests.

Typical ways of obtaining and validating this kind of information include accessing a central trusted authority. For certain limited classes of information this can provide a high level of certainty, but information available in this way is typically rather limited. Another known method is Distributed Identity Management. This method attempts to manage a user identity and access to the user's information rather than information or characteristics associated with an individual.

BRIEF SUMMARY OF THE INVENTION

According to a first aspect of the present invention, there is provided a method of operating a network of connected nodes, the method comprising the steps of maintaining a trust value for each node in the network, maintaining one or more attributes for each node in the network, each attribute comprising a value and a respective confidence level, and performing a validation of a specific attribute of a specific node, the validation comprising: querying nodes connected to the specific node for specific attribute values for the specific node, creating a results set from the returned attribute values from the connected nodes and the trust values of the connected nodes, and processing the results set according to a predefined algorithm to determine a new value and/or a new confidence level for the specific attribute of the specific node.

According to a second aspect of the present invention, there is provided a system for operating a network of connected nodes, the system comprising a processing device connected to a storage device, wherein the storage device is arranged to maintain a trust value for each node in the network and maintain one or more attributes for each node in the network, each attribute comprising a value and a respective confidence level, and the processing device is arranged to perform a validation of a specific attribute of a specific node, the validation comprising: querying nodes connected to the specific node for specific attribute values for the specific node, creating a results set from the returned attribute values from the connected nodes and the trust values of the connected nodes, and processing the results set according to a predefined algorithm to determine a new value and/or a new confidence level for the specific attribute of the specific node.

According to a third aspect of the present invention, there is provided a computer program product on a computer readable medium for operating a network of connected nodes, the product comprising instructions for maintaining a trust value for each node in the network, maintaining one or more attributes for each node in the network, each attribute comprising a value and a respective confidence level, and performing a validation of a specific attribute of a specific node, the validation comprising: querying nodes connected to the specific node for specific attribute values for the specific node, creating a results set from the returned attribute values from the connected nodes and the trust values of the connected nodes, and processing the results set according to a predefined algorithm to determine a new value and/or a new confidence level for the specific attribute of the specific node.

Owing to the invention, it is possible to provide management of a network of connected nodes where information about nodes (which may represent individuals) in the network is either obtained or validated (or both) by a statistical process that interrogates other connected nodes in the network. An element of trust or certainty is attached to each request that allows the final value and level of certainty of each piece of information to be calculated. In addition, the proposed solution is dynamic, in that it can adjust previously calculated values and/or confidence levels based on subsequently discovered information.

In this improved system, each piece of information (or attribute) associated with an individual node in the network is given both a value and a level of certainty (a confidence level). Access to functions and resources of the network system can be controlled based on those two values in any way the system chooses. Either the attribute value, or the level of certainly, or both may be determined and maintained by querying other connected nodes within the network. A third value, a trust level, is also used during these queries in order to construct the level of certainly of the calculated result. Some connected nodes may provide highly trusted information which can lead to a high level of certainly of the result, while other nodes may provide much less trusted information. Over time, in a highly connected network, statistical averaging should help eliminate or minimise deliberately bogus or anomalous results.

A key aspect of this improved system is that the values stored are dynamic and can be altered based on the results of other seemingly unconnected queries within the network, thus allowing the validity of the information held to increase over time. As an example, if a node A has queried node B to determine the validity of some information about A, it will mark that attribute of A with some level of certainty. If node A subsequently uses a more trusted node C to revalidate that information and if that revalidation produces a different result, the level of trust associated with node B may be reduced. Any other information previously validated by B may also now be considered more suspect, and this reduced level of trust can apply of nodes other than A that had previously obtained information from node B.

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
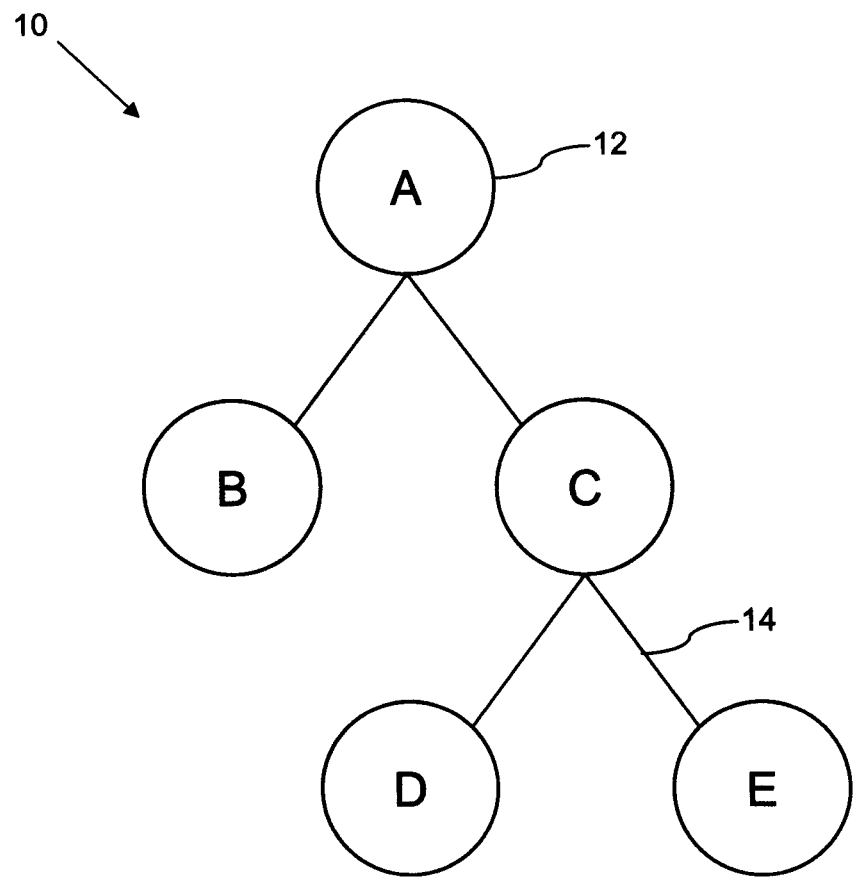
FIG. 1 is a schematic diagram of a network of connected nodes.

FIG. 1 shows a network 10 of multiple connected nodes 12. Each node 12 in the network 10 might represent a person in a social network, or a service provider in a cloud or some other similar individual. Node A is connected to nodes B and C and node C is connected to nodes D and E. The connections in the network 10 represented by the edges 14 are logical connections. For example, in the case of a social network, where the nodes 12 represent individuals, then the edges 14 link together those people who have set an agreed contact level, such as accepting each other as "friends" or agreeing to connect together according to the terms of the social network service provider.

Associated with each node is a set of attributes {A1, A2 . . . An} where each attribute itself has both a corresponding value and a level of certainty of the correctness of that value. Thus attribute An has an associated metadata pair for its value and the certainty of that value: (Vn, Cn). A process is provided by which this metadata pair (Vn, Cn) for each attribute, is initially obtained and subsequently maintained by an interrogation of other nodes 12 within the network 10 and how one or other (or both) of those values can be dynamically updated at any time as a result of discoveries made elsewhere in the network 10.

When granting access to some service requested by or implemented by a node 12, the system can implement some function of both the (Vn, Cn) pair for all the attributes relevant to the request. Several attributes might be involved in granting access and the certainty required may be different for each item involved. Some items may require a very high level of certainty (for example charging a credit card requires certainty of the card holder), others may require less. The generation and updating of the metadata pairs do not describe or define how they are then used, which is up to the network system itself, only how the (Vn, Cn) data is maintained for the node's attribute set.

Figure 2:
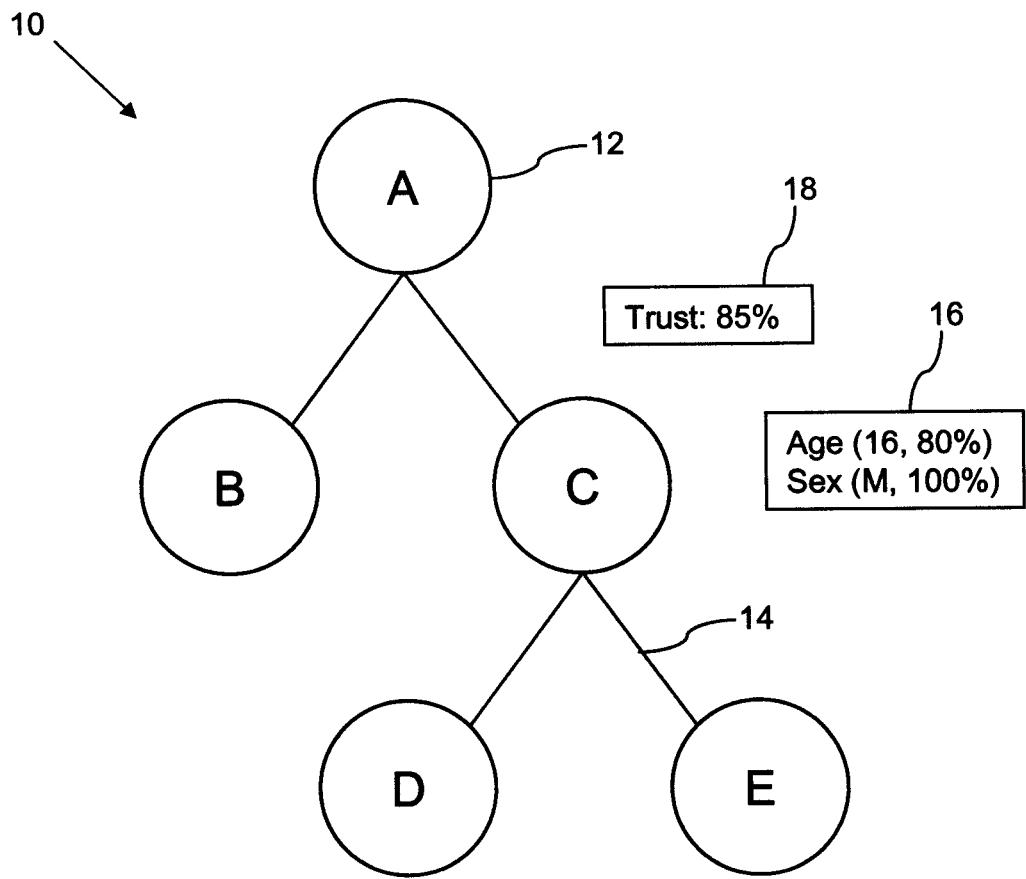
FIG. 2 is a further schematic diagram of the network, with node information.

FIG. 2 shows the network 10 of FIG. 1, with attributes 16 shown for node C. The attributes associated with each node may get initial values from the node 12 itself, for example a social network may populate them with registration data supplied by a user, or they may get initial values by interrogating connected nodes 12 in the network 10. Subsequently these values can be updated or corroborated by further interrogation of other connected nodes 10. The attributes 16 each comprise a value and a respective confidence level, which reflects the system's view of the reliability of the attribute value for that particular attribute. Different nodes 12 can have different attributes 16.

Associated with each node 12 the system needs to assign a level of trust to indicate how reliable the results obtained from that node 12 are likely to be. The results from the connected nodes 12, together with the trust attached to each connection can be combined to build the current (Vn, Cn) pair for any node attribute 16. It is important that the system remembers how the certainty values were constructed, so it is able to respond quickly to feedback if the trustworthiness of connected nodes 12 is subsequently found to change. A trust value 18 is shown for node C, but every node 12 in the network 10 will have a trust value.

As an example of how trust values can be used, if node A derived the certainty of some piece of information from node C which it considered to be trustworthy, but subsequently determined a very different result from a more trusted node B, the trustworthiness of C would be questioned and lowered. This could affect the certainty of other information derived using node C, not only for node A but for other connected nodes D and E too. Thus the system can constantly change and adapt based on combined and newly discovered information, over a period of time with a large number of nodes, should obtain a statistical steady state where nodes deliberately trying to provide false information have little effect on the overall system and results.

Figure 3:
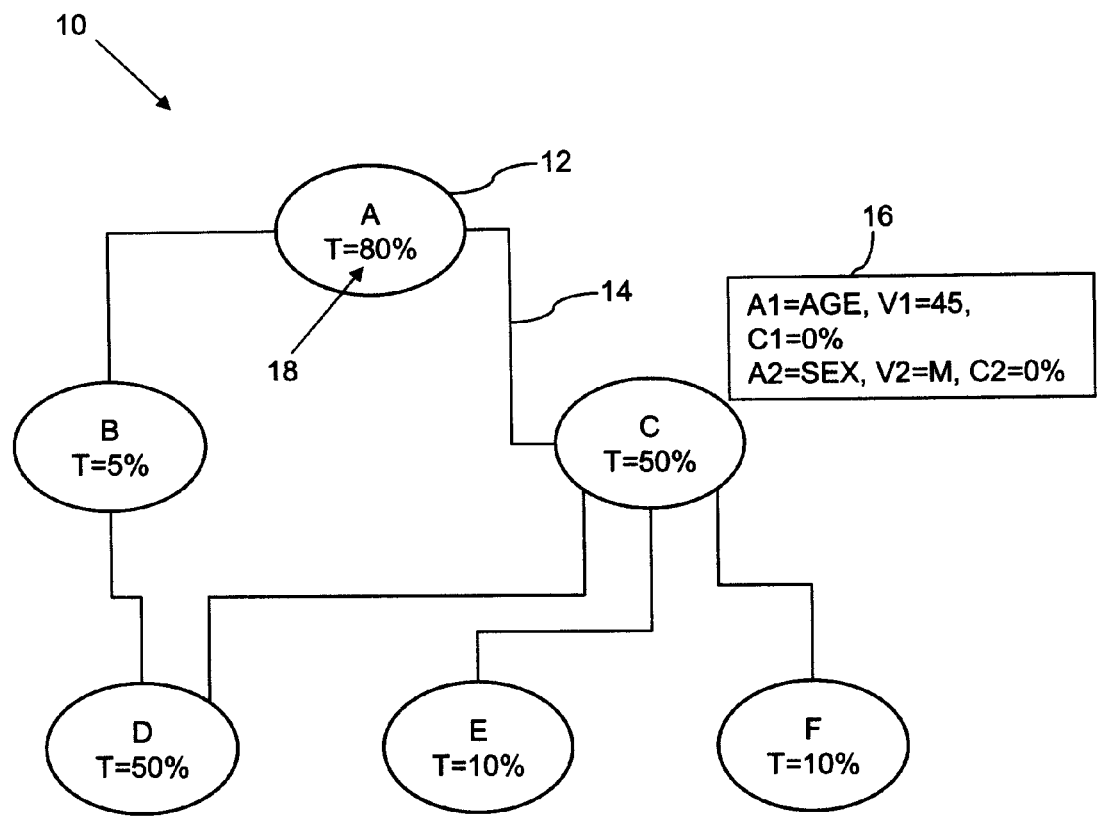
FIGS. 3 and 4 are schematic diagrams of a different network of connected nodes.

FIG. 3 shows a different network 10 of connected nodes 12. In this example it is assumed that there is a network 10 of nodes 12 in some initial state. Each node 12 has an associated trust value 18, indicated by the T=x %, shown within each node 12. For simplicity, it is assumed that the trust values 18 are indicated by a percentage, with 0% meaning untrustworthy and 100% meaning fully trusted. Although percentages are used, any other type of scale can be used to represent the trust value 18, as long as different levels of trust can be indicated on the scale being used. A decimal scale could be used, for example.

Each node 12 of the network 10 also has a set of attributes 16 where each attribute 16 has both a value and a confidence level, as discussed above. Some examples of typical attributes 16 are shown for node C, where the confidence level for the attribute's value is again represented by a simple percentage. In this example, the system has set initial confidence values of 0%, but this is not essential and the system is free to set whatever initial values it chooses. As above, other ways of representing the confidence level can be used, as long some sort of scale is represented by the different confidence levels that can be used.

The nodes 12 that form the network 10 represent individuals in a social network and obviously a small subset are shown in this Figure, for illustrative purposes. Node C may be a new addition to the network 10, who has connected to nodes A, D, E and F using whatever mechanism is provided by the social network. The other nodes 12 in the network 10 are assumed to be carrying information concerning the attributes 16 of the new node C. How this information is obtained and stored is not material to the functioning of the validation process, but some of the connected nodes 12 must carry information concerning the attributes 16 of the new node C.

Figure 4:
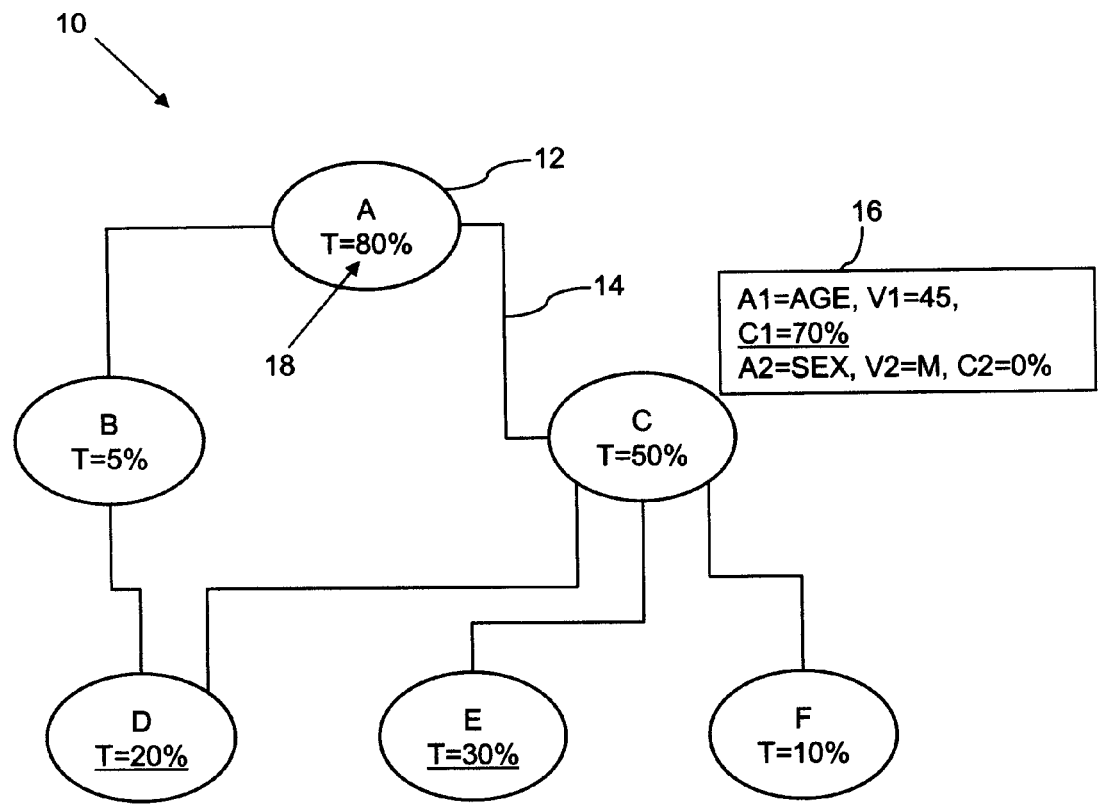

As shown in FIG. 4, the system wishes to validate, or at least improve its confidence level, of an attribute of Node C, in this case the system wants to validate the Age attribute. The system does this by following the process outlined in the flowchart of FIG. 5. Essentially this involves asking connected nodes 12 if they can provide a value for this attribute 16. The connected nodes 12 will either return a value, for which there is an associated trust, or they will be unable to help. For this example, the connected nodes A, D, E and F are queried and get back the following values (and trust levels): node A: 45 (80%), node D: 18 (50%), node E: 45 (10%) and node F: no result.

From this set of results, the system can adjust both the value and confidence level of the attribute 16 and the trust value 18 associated with connected nodes 12. The precise algorithms used for doing are not defined here, as they will be system dependent. But in this example, it can be imagined that, from the results provided, the system can set a value of 45 of the Age attribute of node C and it can have a high level of confidence in this value, as node A provided this value and node A has a trust value of 80%. The confidence level C1 is changed to 70%, as indicated by the underlining in the Figure. It can also be seen that the system will reduce the trust level associated with node D and increase the trust level of node E, as the value from node D does not agree with the value from node A, whereas the value from node E does agree with the value from node A, the changes again illustrated by underlining. It is also possible to adjust the confidence level of an attribute previously validated by a connected node that has a new trust value, for example lowering the confidence level if the new trust value is decreased.

It is worth noting how an action essentially associated with node C has fed-back information into the network that can affect other nodes 12 in the network 10. In this example, a subsequent attempt to validate an attribute of node B will now have considerably less trust of the results from node D than in the initial state, as node D's trust value 18 has changed from 50% (FIG. 3) to 20% (FIG. 4). This is intended as an example of one possible implementation, but others are equally valid. For example, a different implementation may choose to associate the trust value 18 with a node connection 14 (rather than a node 12) so that different nodes 12 can have differing views of the trustworthiness of their peers. In this case, a trust value 18 for a node 12 is derived from the node connection 14, depending upon which connected node 12 is being validated.

Figure 5:
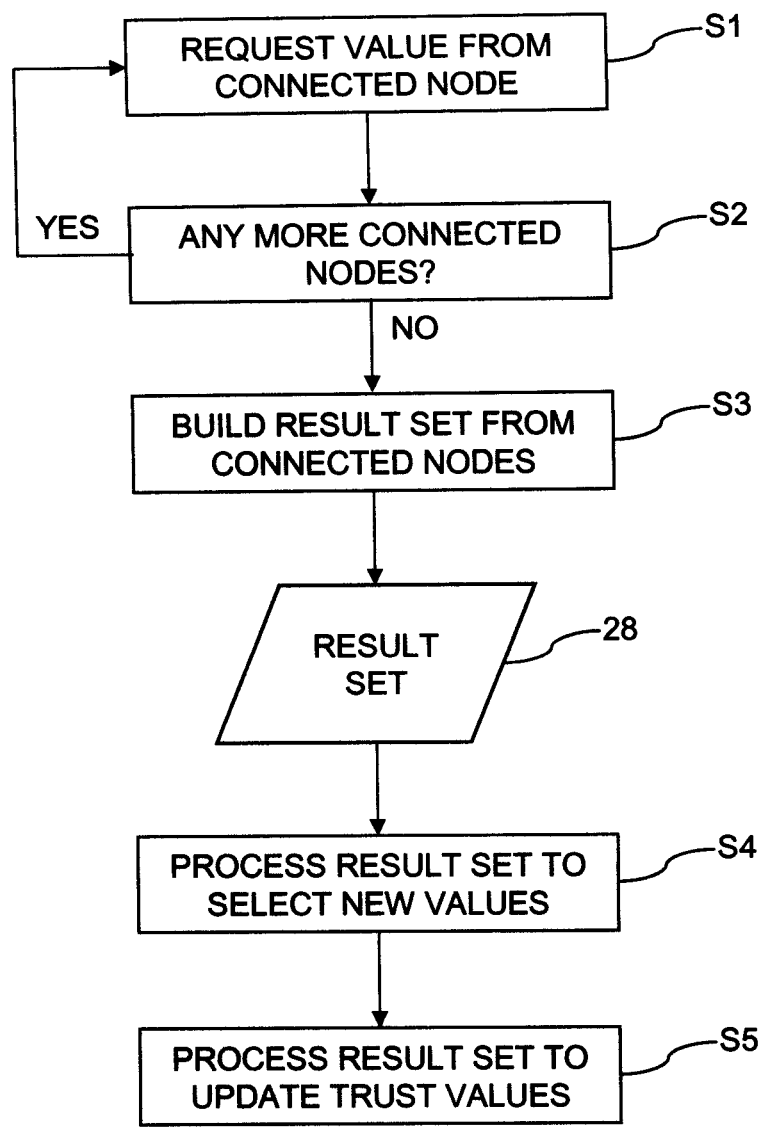
FIG. 5 is a flowchart of a method of operating a network of connected nodes.

FIG. 5 shows a flowchart of a method of operating the system that manages the network 10 of connected nodes 12, in relation to the validation of a node's attribute value. The first step in this process (step S1) is to request values for the attribute 16 from a connected node 12 and (via step S2) this process is repeated for all such connected nodes 12. Not all connected nodes 12 will be able to provide values for the specific attribute level for the specific node 12. The next step (step S3) is to build a results set 28 from the information provided by the connected nodes 12. The results set 28 is constructed from the returned attribute values from the connected nodes 12 and the trust values 18 of the connected nodes 20. The results set 28 will take the form of a table, where each row comprises "node n: [value, trust]" indicating which node provided what value and the trust value of that node.

The next step (step S4) is to process the results set 28 according to a predefined algorithm to determine a new value for the attribute 16 of the node 12 and/or to determine a new confidence level for the attribute 16 of the node 12. Essentially any new values are derived from the values returned from the connected nodes 12 that have high trust values 18 (in either an absolute sense or a relative sense). The new attribute value could be set as the value returned by the connected node 12 with the highest trust value 18 and the new confidence level could be based on a weighted average of the trust values 18 of those nodes 12 that returned the particular attribute value.

The final step (step S5) in the process comprises processing the results set according to a predefined algorithm to determine a new trust value 18 for one or more of the nodes 12 connected to the specific node 12. The results set can be used to change the trust value 18 that is assigned to any node 12 that provided information used in the creation of the results set 20. For example, if one node 12 provided an attribute value that is at odds with the attribute values provided by the other nodes 12 then this node may have its trust value 18 reduced. Similarly nodes 12 that fall in with the majority verdict can have their trust value 18 increased.

Figure 6:
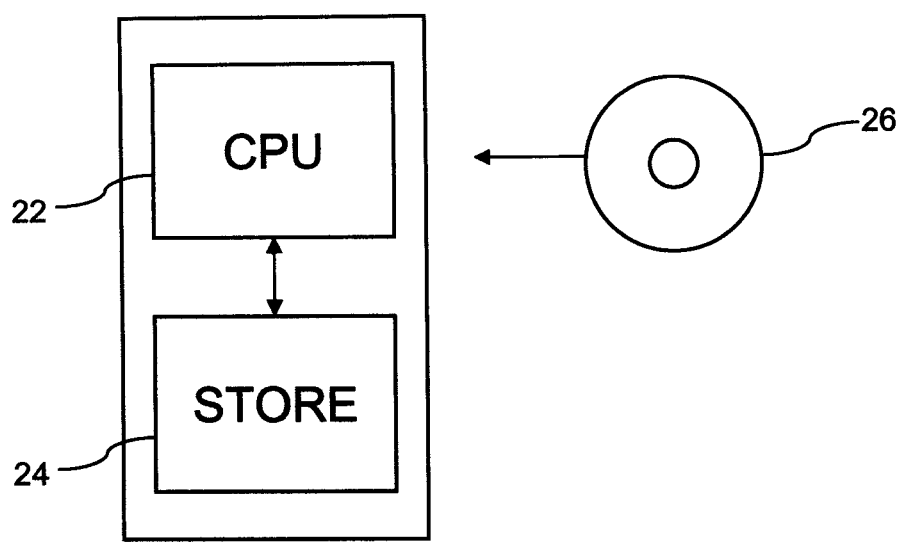
FIG. 6 is a schematic diagram of system for operating the network.

FIG. 6 shows an example of a system for operating the network 10 of connected nodes 12. The system comprises a processing device 22 connected to a storage device 24. The storage device 24 is arranged to maintain a trust value 18 for each node 12 in the network 10 (which may comprise multiple values if they are attached to node connections) and to maintain one or more attributes 16 for each node 12 in the network 10, each attribute 16 comprising a value and a respective confidence level. The storage device 24 stores the information that the processing device 22 will use to updates the various values, as new connections 14 are made in the network 10 and as nodes 12 join and leave the network 10.

The processing device 22 is arranged to perform the validation of specific attributes 16 of specific nodes 12, which can be triggered by new information being received, such as a new node 12 joining the network 10. The validation process comprises the steps of querying nodes 12 connected to a specific node 12 for attribute values for this node 12, creating a results set from the returned attribute values from the connected nodes 12 and the trust values 18 of the connected nodes 12, and processing the results set according to a predefined algorithm to determine a new value and/or a new confidence level for the attribute 16 of the node under investigation.

As described above, in the same validation process, both the value and the confidence level of the attribute 16 can be adjusted based on a processing of the results set and also the trust values of the nodes 12 that are represented in the results set can also be adjusted. The processing device 22 can be controlled by the instructions of a computer program product which are retrieved from a computer readable medium 26. The processing device 24, executing the instructions of the computer program product, dynamically manages the attribute metadata that is encoded in the attribute value and confidence level. Changes in the network will be translated into changes in the metadata values and in the trust values associated with nodes 12 of the network 10.

The invention claimed is:

1. A method of operating a network of connected nodes, the method comprising:

maintaining a trust value for each node in the network, in a storage device accessible to the network;

maintaining one or more attributes for each node in the network, in the storage device accessible to the network, each attribute comprising a value and a respective confidence level;

performing a validation of a specific attribute of a specific node, by a processing device accessible to the storage device and the network, the validation comprising:

querying nodes connected to the specific node for specific attribute values for the specific node by the processing device;

creating a results set, by the processing device, from returned attribute values from the connected nodes queried and the trust values of the connected nodes queried;

processing the results set, by the processing device, according to a predefined algorithm to determine a new value and/or a new confidence level for a respective attribute of specific attributes of the specific node; and changing the value and/or the respective confidence level of the respective attribute of the specific attributes of the specific node, by the processing device, in response to the new value and/or the new confidence level for the respective attribute of the specific attributes of the specific node determined, wherein the specific attribute values maintained in the storage device by the processing device, are dynamically altered by the processing device based on the processing of the results set of one or more queries within the network, to increase validity of information held in the storage device over time.

2. A method according to claim 1, further comprising processing the results set, by the processing device, according to the predefined algorithm to determine a new trust value for one or more of the nodes connected to the specific node.

3. A method according to claim 2, further comprising adjusting the confidence level of an attribute previously validated by a connected node that has a new determined trust value, by the processing device.

4. A method according to claim 1, wherein the step of processing the results set, by the processing device, according to the predefined algorithm to determine the new value for the respective attribute of the specific attributes of the specific node comprises setting the new value of the respective attribute of the specific attributes of the specific node to the value returned by the connected node with greatest trust value, by the processing device.

5. A method according to claim 1, wherein the processing the results set, by the processing device, according to the predefined algorithm to determine the new value for the respective attribute of the specific attributes of the specific node comprises setting the new value of the respective attribute of the specific attributes of the specific node to the value returned by the greatest number of connected nodes, by the processing device.

6. The method according to claim 1,
wherein the network is a social network and the nodes of the network represent persons of the social network, and wherein the network and the nodes are maintained on one or more storage devices.

7. The method according to claim 1,
wherein the network is a computing cloud and the nodes of the network represent a service provider in the cloud, and wherein the network and the nodes are maintained on one or more storage devices accessible to the network.

8. The method according to claim 1,
wherein the trust value, each node, and the one or more attributes are maintained in a non-transitory storage device accessible to the network; and
wherein the validation is performed with the processing device connected to the non-transitory storage device accessible to the network.

9. A system for operating a network of connected nodes, the system comprising a processing device connected to a storage device, wherein:
the storage device accessible to the network maintains a trust value for each node in the network and maintains one or more attributes for each node in the network, each attribute comprising a value and a respective confidence level;
the processing device accessible to the network and the storage device validates a specific attribute of a specific node, a validation comprising:
query nodes connected to the specific node for specific attribute values for the specific node;
create a results set from returned attribute values from the connected nodes queried and the trust values of the connected nodes queried;
process the results set according to a predefined algorithm to determine a new value and/or a new confidence level for a respective attribute of specific attributes of the specific node; and
change the value and/or the respective confidence level of the respective attribute of the specific attributes of the specific node, by the processing device, in response to the new value and/or the new confidence level for the respective attribute of the specific attributes of the specific node determined, wherein the specific attribute values maintained in the storage device by the processing device, are dynamically altered by the processing device, based on processing of the results set of one or more queries within the network, to increase validity of information held in the storage device over time.

10. A system according to claim 9, wherein the processing device further processes the results set according to the predefined algorithm to determine a new trust value for one or more of the nodes connected to the specific node.

11. A system according to claim 10, wherein the processing device further processes the results set to adjust the confidence level of an attribute previously validated by a connected node that has a new determined trust value.

12. A system according to claim 9, wherein the processing device further processes the results set according to the predefined algorithm, to determine a new value for the respective attribute of the specific attributes of the specific node, to set the new value of the specific attribute of the specific node to the value returned by the connected node with greatest trust value.

13. A system according to claim 9, wherein the processing device further processes the results set according to the predefined algorithm, to determine a new value for the respective attribute of the specific attributes of the specific node, to set the new value of the respective attribute of the specific attributes of the specific node to the value returned by the greatest number of connected nodes.

14. A computer program product for operating a network of connected nodes, comprising a non-transitory computer readable medium having instructions stored thereon for execution by a processing device to direct the processing device to:
maintain a trust value for each node in the network;
maintain one or more attributes for each node in the network, each attribute comprising a value and a respective confidence level;
perform a validation of a specific attribute of a specific node, the validation comprising:
query nodes connected to the specific node for specific attribute values for the specific node;
create a results set from returned attribute values from the connected nodes queried and the trust values of the connected nodes queried;
process the results set according to a predefined algorithm to determine a new value and/or a new confidence level for a respective attribute of specific attributes of the specific node; and
change the value and/or the respective confidence level of the respective attribute of the specific attributes of the specific node in response to the new value and/or the new confidence level for the respective attribute of the specific attributes of the specific node determined, wherein the specific attribute values maintained in a storage device are dynamically altered based on processing of the results set of one or more queries within the network, to increase validity of information held in the storage device over time.

15. The computer program product according to claim 14, further comprising instructions for processing the results set according to the predefined algorithm to determine a new trust value for one or more of the nodes connected to the specific node.

16. The computer program product according to claim 15, further comprising instructions for adjusting the confidence level of an attribute previously validated by a connected node that has a new determined trust value.

17. The computer program product according to claim 14, wherein the instructions for processing the results set according to the predefined algorithm to determine a new value for the specific attribute of the specific node comprise instructions for setting the new value of the specific attribute of the specific node to the value returned by the connected node with greatest trust value.

18. The computer program product according to claim 4, wherein the instructions for processing the results set according to the predefined algorithm to determine a new value for the respective attribute of the specific attributes of the specific node comprise instructions for setting the new value of the respective attribute of the specific attributes of the specific node to the value returned by the greatest number of connected nodes.

* * * * *